(12) United States Patent
Butler et al.

(10) Patent No.: US 9,175,181 B2
(45) Date of Patent: Nov. 3, 2015

(54) THERMAL INKJET LATEX INKS

(75) Inventors: Thomas W. Butler, San Diego, CA (US); Andre Garcia, Poway, CA (US); Rodney D. Stramel, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/009,030

(22) PCT Filed: Apr. 29, 2011

(86) PCT No.: PCT/US2011/034569
§ 371 (c)(1),
(2), (4) Date: Sep. 30, 2013

(87) PCT Pub. No.: WO2012/148421
PCT Pub. Date: Nov. 1, 2012

(65) Prior Publication Data
US 2014/0043398 A1    Feb. 13, 2014

(51) Int. Cl.
| G01D 11/00 | (2006.01) |
| C09D 11/30 | (2014.01) |
| C09D 5/16 | (2006.01) |
| C09D 11/322 | (2014.01) |
| C09D 133/04 | (2006.01) |
| B41J 2/14 | (2006.01) |
| C09D 11/38 | (2014.01) |

(52) U.S. Cl.
CPC .............. *C09D 11/30* (2013.01); *B41J 2/14427* (2013.01); *C09D 5/1637* (2013.01); *C09D 11/322* (2013.01); *C09D 11/38* (2013.01); *C09D 133/04* (2013.01)

(58) Field of Classification Search
None
See application file for complete search history.

(56) References Cited

U.S. PATENT DOCUMENTS

| 4,686,260 | A | * | 8/1987 | Lindemann et al. | 524/458 |
| 7,537,650 | B2 | | 5/2009 | Szajewski et al. | |
| 7,560,052 | B2 | | 7/2009 | Enciu et al. | |
| 7,572,326 | B2 | | 8/2009 | Choy et al. | |
| 7,872,060 | B2 | | 1/2011 | Schmid et al. | |
| 2003/0105187 | A1 | * | 6/2003 | Iijima | 523/160 |
| 2004/0118321 | A1 | * | 6/2004 | Fu et al. | 106/31.58 |
| 2005/0234150 | A1 | * | 10/2005 | Omatsu et al. | 523/160 |
| 2006/0007287 | A1 | * | 1/2006 | Cagle et al. | 347/100 |
| 2006/0065158 | A1 | | 3/2006 | Uhlir-Tsang | |
| 2006/0257441 | A1 | * | 11/2006 | Komai et al. | 424/405 |
| 2006/0258777 | A1 | | 11/2006 | Vincent et al. | |
| 2007/0100023 | A1 | | 5/2007 | Burns et al. | |
| 2007/0211125 | A1 | | 9/2007 | Vasudevan et al. | |
| 2008/0186373 | A1 | | 8/2008 | Rolly | |

(Continued)

FOREIGN PATENT DOCUMENTS

| CN | 101523184 A | 9/2009 |
| CN | 101896562 A | 11/2010 |

(Continued)

*Primary Examiner* — Erica Lin
(74) *Attorney, Agent, or Firm* — VanCott, Bagley, Cornwell

(57) ABSTRACT

In one example, an anti-fouling latex ink includes a liquid vehicle, a pigment dispersed in the liquid vehicle, latex dispersed in the liquid vehicle, and a polystyrene anti-fouling additive dispersed in the liquid vehicle as a free solution. An illustrative method of formulating a latex inkjet ink includes forming a liquid vehicle with water as primary solvent, dispersing pigments in the liquid vehicle, and adding 0.01 wt % to 1 wt % of a polystyrene antifouling additive as a free solution to the liquid vehicle.

13 Claims, 7 Drawing Sheets

(56) References Cited

U.S. PATENT DOCUMENTS

2008/0207805 A1 8/2008 Blease et al.
2009/0192248 A1* 7/2009 Palumbo et al. .............. 524/186
2010/0277526 A1 11/2010 Chen et al.
2011/0039027 A1 2/2011 Tamura et al.

FOREIGN PATENT DOCUMENTS

| EP | 2090624 A1 | 8/2009 |
| GB | 2401872 A | 11/2004 |
| JP | 2005-179679 | 7/2005 |
| WO | WO-2009/078833 A1 | 6/2009 |

* cited by examiner

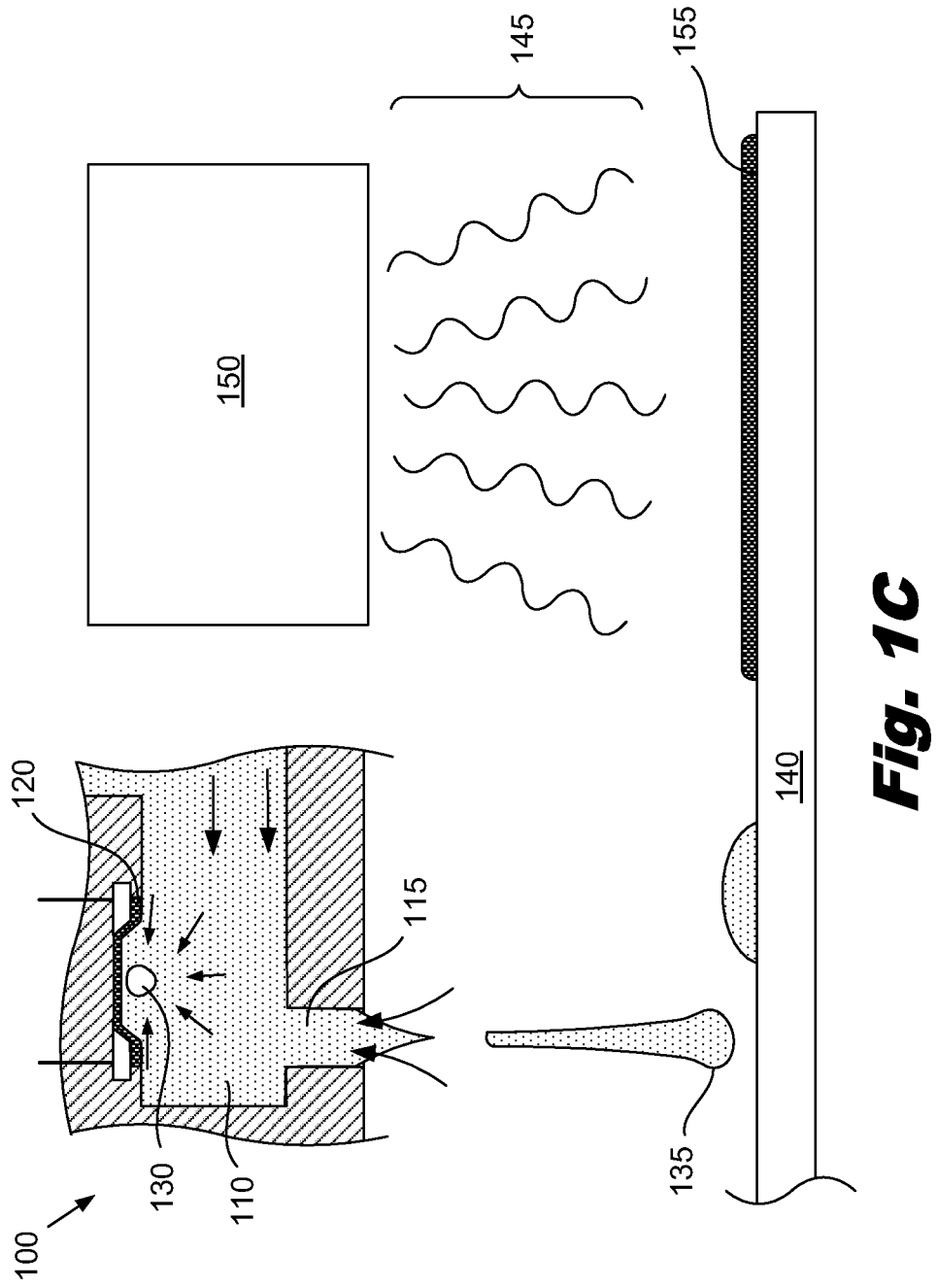

THERMAL INKJET LATEX INKS

BACKGROUND

Inkjet technology is widely used for precisely and rapidly dispensing small quantities of fluid on a substrate. Inkjets eject droplets of fluid out of a nozzle by creating a short pulse of high pressure within a firing chamber. During printing, this ejection process can repeat thousands of times per second. Ideally, each ejection would result in a fluid droplet with a predetermined size that travels at a predetermined velocity to the substrate. Maintaining the performance of the droplet ejection over time ensures high quality printing over the lifetime of the print head.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 1A-1C are cross sectional diagrams that show the operation of an illustrative thermal inkjet ejecting and curing latex inkjet ink, according to one example of principles described herein.

Throughout the drawings, identical reference numbers designate similar, but not necessarily identical, elements.

DETAILED DESCRIPTION

Figure 1A:
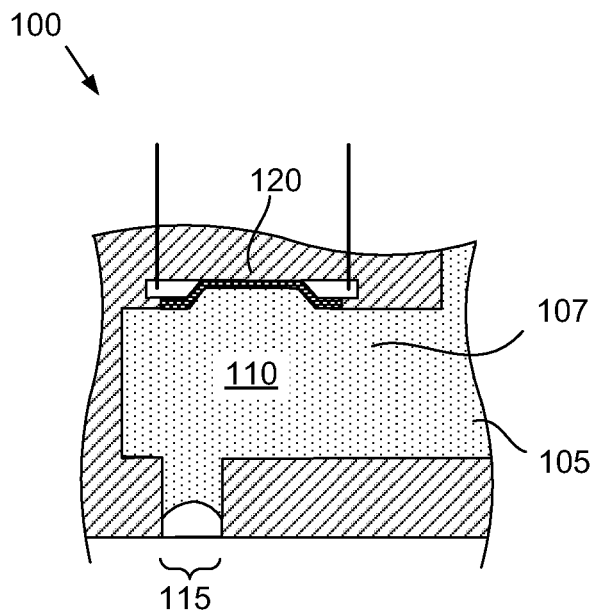

As discussed above, inkjet technology is widely used for precisely and rapidly dispensing small droplets of fluid. Ideally, each firing event would result in a single droplet that has a predetermined weight and predetermined velocity and is deposited in the desired location on the substrate. However, the characteristics of the thermal inkjet droplet generators can change over time, resulting in the ejection of ink droplets with different weights and velocities.

The inventors have discovered that when the thermal inkjet droplet generator is used to eject latex inkjet ink, latex solids may accumulate on the firing resistor. This can undesirably influence the performance of the inkjet droplet generator. The inventors have unexpectedly discovered that the accumulation of latex on the firing resistor can be mitigated by including an anti-fouling polystyrene additive to the ink. Incorporation of this anti-fouling additive substantially maintains the performance of the inkjet droplet generators over time.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

As discussed above, the inkjet printing process deposits fluids on a substrate by ejecting fluid droplets from a nozzle. For example, in a thermal inkjet, the printhead includes an array of droplet generators connected to one or more fluid reservoirs. Each of the droplet generators includes a heating element, a firing chamber and a nozzle. Fluid from the reservoir fills the firing chamber. To eject a droplet, an electrical current is passed through a heater element placed adjacent to the firing chamber. The heating element generates heat that vaporizes a small portion of the fluid within the firing chamber. The vapor rapidly expands, forcing a small droplet out of the firing chamber nozzle. The electrical current is then turned off and the resistor cools. The vapor bubble rapidly collapses, drawing more fluid into the firing chamber from a reservoir. Typically, the inkjet device contains a large array of nozzles that eject thousands of droplets per second.

As discussed above, inkjet devices can be used to print latex inkjet inks. Latex inkjet inks include polymer latex particles dispersed in a fluid carrier. Latex inkjet inks have a number of advantages including conformability and high stretch performance, odorless prints, quick cure times, high water resistance, resistance to UV color fade, scratch resistance, and other advantages. Latex inkjet inks may include pigments, latex particles, a liquid carrier and additional components. Latex inks can be heat cured to soften and flow the polymer latex particles. This encapsulates the pigment particles and binds them to the substrate. However, heat generated by the firing resistor during ejection of the latex ink droplets can undesirably cause the latex to accumulate on the firing resistor. An illustrative latex inkjet ink formulation is given below.

Pigments

A wide variety of pigments can be used in a latex ink. For example, in a KCMY colored ink set, the pigments may include: yellow pigments PY-150, PY-151, PY-185, PY-138, PY-139, PY-110, PY-155, PY-74, PY-111, PY-185, PY-213, PY-215; Cyan pigments: PB15:0, PB15:3, PB15:4, PB15:6; Magenta pigments: PV-19, PR-122, PR-202, PR-282; and black pigment PB-7.

If black is used, the black pigment can be any commercially available black pigment that provides acceptable optical density and print characteristics. Such black pigments can be manufactured by a variety of methods such as channel methods, contact methods, furnace methods, acetylene methods, or thermal methods, and are commercially available from such vendors as Cabot Corporation, Columbian Chemicals Company, Evonik, Mitsubishi, and E.I. DuPont de Nemours and Company. For example, commercially available carbon black pigments include Color Black FW 200, Color Black FW 2V, Color Black FW1, Color Black FW 18, Color Black FW S160, Color Black FW S170, Printex including 95, 85, 75, 55, 45, 300, 35, 25, 200, 12, and Special Blacks including, 4A, 4, 5, 6, 550, 350, 250; BP1100, BP900, BP800, M1100, M900, M800, Monarch 1400, Monarch 1300, Monarch 1100, Monarch 1000, Monarch 900, Monarch 880, and Monarch 700; Cab-O-Jet 200 and Cab-O-Jet 300; Raven 2500 ultra, Raven 2000, Raven 7000, Raven 5750, Raven 5250, Raven 5000, and Raven 3500; 45 B, and combinations thereof.

In addition to black, other pigment colorants can be used, such as cyan, magenta, yellow, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in powder, press cake, or dispersion form from a number of sources.

Typically, the pigments of the present latex inkjet ink can be from about 5 nm to about 10 microns, and in one aspect, the pigments can be from 10 nm to about 500 nm in size, although sizes outside this range can be used if the pigment can remain dispersed and provide adequate printing properties.

The pigments can be chemically modified in a variety of ways to increase their dispersion in the liquid carrier. For example, a cyan pigment may be chemically modified using a JONCRYL additive such as JONCRYL 683. Other pigments, such as magenta may or may not use chemical modification to achieve the desired dispersion stability.

Latexes

Latex can serve as a binder that encapsulates pigment particles and adheres to the substrate. Consequently, the latex increases the durability of the printed article. Latex is a liquid suspension comprising a liquid (such as water and/or other liquids) and polymeric particulates from 20 nm to 500 nm (and often from 100 nm to 300 nm) in size. Typically, the polymeric particulate can be present in the liquid from 0.5 wt % to 20 wt %. Such polymeric particulates can comprise a plurality of monomers that are typically randomly polymerized, and can also be crosslinked. Additionally, in one implementation, the latex component can have a glass transition temperature from about −20 to +100 degrees C. For example, the size of the latex particles size can range from approximately 100 to 350 nanometers with a glass transition temperature ranging at or above 90 degrees C.

Latex polymers particles can be prepared using a variety of emulsion polymerization techniques where co-monomers are dispersed and polymerized in a discontinuous phase of an emulsion. For example, latex may be prepared by using emulsion polymerization of various ratios of monomer such, but are in no way limited to, methyl methacrylate, styrene, various 'soft' acrylate esters, and functionalized monomers. These functionalized monomers include 'vinyl' monomers containing hydroxyl groups, carboxylic acids, sulfonic or sulfate acids and phosphate acids, where 'vinyl' denotes derivatives of acrylates, methacrylates, functionalized styrene, allyl ether and esters, vinyl ethers as selected examples. Monomers that are often used include ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; and iso-octyl methacrylate.

The latexes used herein can be prepared by latex emulsion polymerization, and, in one implementation, can have a weight average molecular weight from 10,000 Mw to 5,000,000 Mw. This range is only illustrative and can be broader. Co-polymers can be formed, including block copolymers, randomly assembled copolymers, copolymers including crosslinkers, or the like. Often the copolymer is a randomly assembled copolymer, though various subclasses of each polymer type can be used, e.g., core-shell, various glass transition temperatures, surface acid groups, crosslinking, etc. It is noted that it is not the purpose of the present disclosure to describe all different types of latexes that can be used. Thus, the description of such latexes should not be considered limiting with respect to type of dispersed polymer that can be used.

The latex particles may include both self-dispersed and functionalized latex polymers. Functionalized latex particles may be formed with a measured amount of surface acid groups to provide stability over longer periods of time (to resist aggregation), to provide improved adhesion to certain polar interfaces, but not so much as to negatively impact water resistance. In a more detailed aspect, the latex particles can be prepared using various monomers as sources of acid functionality. In use polymeric acid functionalities are neutralized to provide a latex particle surface charge. Typical acid functionality may include ionizable groups such as carboxylic acids, sulfonic or sulfate acids and phosphate acids.

Liquid Vehicles

The liquid vehicle may include a number of components, including water, a phosphate-containing surfactant, organic co-solvents, other surfactants, biocides, sequestering agents, etc. With respect to the phosphate-containing surfactant, the phosphate surfactant can be a phosphate ester of fatty alcohol alkoxylates. In one implementation, the surfactant can be a mixture of mono- and diesters, and can have an acid number from 50 to 150. In another implementation, the phosphate-containing surfactant can be of the Crodafos family. Specific examples include oleth-3 phosphate, oleth-10 phosphate, oleth-5 phospahte, dioleyl phosphate, ppg-5-ceteth-10 phosphate, $C_9$-$C_{15}$ alkyl monophosphate, deceth-4 phosphate, and mixtures thereof. Other specific examples by tradename include Crodafos N3A, Crodafos N3E, Crodafos N10A, Crodafos HCE, Crodafos SG, Arlantone Map 950, Monofax 831, Monofas 1214, Monalube 215, and Atlox DP13/6.

In some implementations, the ink-jet ink compositions can be substantially free of surfactants other than the phosphate-containing surfactant. However, certain second surfactants can also be used and may include standard water-soluble surfactants such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, fluorosurfactants, and mixtures thereof. In one specific example, a fluorosurfactant can be used as the second surfactant. In another implementation, a secondary alcohol ethoxylated surfactant can be used. If used, the second surfactant can be present at from 0.001 wt % to 10 wt % of the ink-jet ink composition, and in one implementation, can be present at from 0.001 wt % to 0.1 wt %.

In the ink-jet inks described herein, suitable co-solvents for use include water and water soluble organic co-solvents. Examples of such water soluble organic co-solvents include, but are not limited to, aliphatic alcohols, aromatic alcohols, diols, triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of co-solvents include, but are not limited to, 1,5-pentanediol, 2-pyrrolidone, Liponic ethoxylated glycerol 1 (EG-1), Liponic ethoxylated glycerol 7 (EG-7), 2-methyl-2,4-pentanediol, 2-methyl-1,3-propanediol, 2-ethyl-2-hydroxymethyl-1,3-propanediol, diethylene glycol, 3-methoxybutanol, propylene glycol monobutyl ether, 1,3-dimethyl-2-imidazolidinone, and derivatives thereof. Co-solvents can be added to reduce the rate of evaporation of water in the ink to minimize clogging or other properties of the ink such as viscosity, pH, surface tension, optical density, and print quality. The water soluble organic co-solvent total concentration can range from about 5 wt % to about 50 wt %. In one implementation, when multiple co-solvents are used, each co-solvent can be typically present at from about 0.5 wt % to about 20 wt % of the ink-jet ink composition. This being said, the solvents may be present in the ink-jet ink composition at any concentration. In particular, the concentration of solvents such as 2-pyrrolidinone and its derivatives may play a role in helping the latex form a durable film on the vinyl media when used in conjunction with at least one secondary alcohol ethoxylate and at least one fluorosurfactant. In an implementation, the ink-jet ink composition may comprise 2-pyrrolidinone or its derivatives in combination with a humectant solvent, such as 2-methyl-1,3,-propanediol. In other words, the ink-jet ink can comprise a liquid vehicle including a plurality of solvents, and included among the plurality of solvents can be from 10 wt % to 30 wt % of a solvent system consisting of one or more of 2-pyrrolidone, a derivative of 2-pyrrolidone, and a humectant, such as 2-methyl-1,3-propanediol.

Various buffering agents can also be used in the ink-jet ink compositions. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components. If used, buffering agents typically comprise less than about 10 wt % of the ink-jet ink composition.

Various biocides can be used to inhibit growth of undesirable microorganisms. Several non-limiting examples of suitable biocides include benzoate salts, sorbate salts, commercial products such as NUOSEPT, UCARCIDE, VANCIDE, PROXEL, and other biocides. Typically, such biocides comprise less than about 5 wt % of the ink-jet ink composition and often from about 0.05 wt % to about 2 wt %.

Illustrative latex ink formulations are given in Table 1 below.

TABLE 1

| | |
|---|---|
| Pigment | 1-5% |
| Latex | 1-10% |
| 2-Pyrrolidone | 10-19% |
| MPDiol | 1-9% |
| Fluorsurfactant | 0.10-0.75% |
| Crodafos N3 acid | 0.1-1% |
| Tergitol 15-S-12 | 0.1-0.5% |
| Deionized Water | remainder |
| Pigment | 1-5% |
| 2-Pyrrolidone | 16.00% |
| MPDiol | 9.00% |
| Fluorsurfactant | 0.75% |
| Crodafos N3 acid | 0.20% |
| Tergitol 15-S-12 | 0.35% |
| Deionized Water | remainder |
| Pigment | 1-5% |
| 2-Pyrrolidone | 16.00% |
| MPDiol | 9.00% |
| Fluorsurfactant | 0.75% |
| Crodafos N3 acid | 0.20% |
| Tergitol 15-S-12 | 0.35% |
| Deionized Water | remainder |

As shown above, the primary solvent in the inkjet inks is deionized water. The water makes up approximately 65 to 75% of the total weight of the ink. The inkjet inks do not contain substantial amounts of volatile organic compounds. The absence of volatile organic compounds allows the latex inkjet printing processes to be performed without special ventilation without extended curing times, or undesirable solvent odors. As used in the specification and appended claims, the term primary solvent refers to the solvent in an ink that makes up at least 50% of the ink by weight.

The preparation of a latex inkjet ink can be carried out in many different ways. In one implementation, the liquid phase of the latex and a liquid vehicle of an ink can become admixed to form a modified liquid vehicle containing latex particulates and colorant. When the colorant is a self-dispersed or conventionally dispersed pigment, the total solids content of the latex particulates and pigments can be considered when determining relative amounts that should be present for jettability purposes.

Figure 1B:
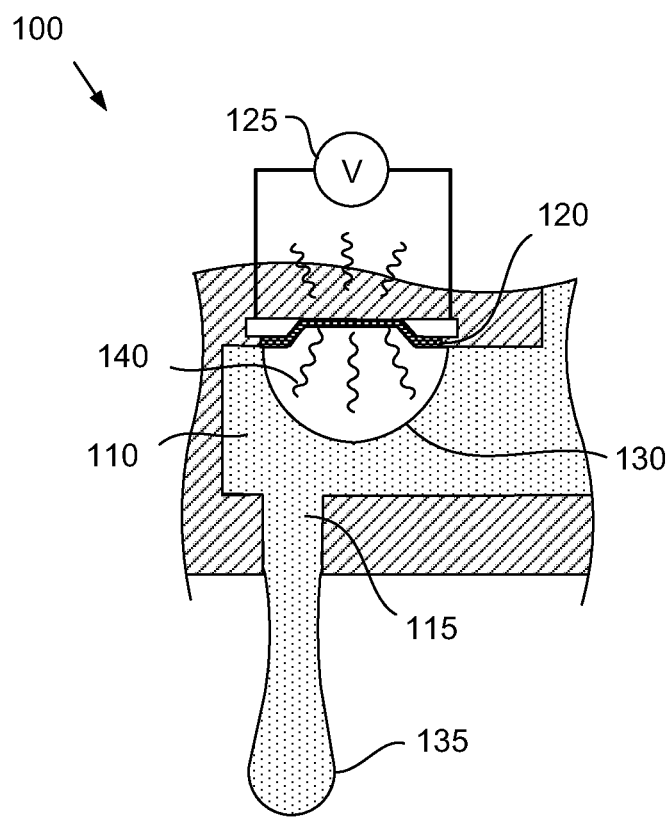

FIGS. 1A-1C are cross sectional diagrams that show the operation of an illustrative thermal inkjet ejecting and curing latex inkjet ink. FIG. 1A is a cross-sectional view of one illustrative implementation of a droplet generator (100) within a thermal inkjet printhead. The droplet generator (100) includes a firing chamber (110) that is fluidically connected to a fluid reservoir (105). A heating element (120) is located in proximity to the firing chamber (110). Fluid (107) enters the firing chamber (110) from the fluid reservoir (105). Under isostatic conditions, the fluid does not exit the nozzle (115), but forms a concave meniscus within the nozzle exit.

FIG. 1B is a cross-sectional view of a droplet generator (100) ejecting a droplet (135) from the firing chamber (110). The droplet (135) is ejected from the firing chamber (110) by applying a voltage (125) to the heating element (120). The heating element (120) can be a resistive material that rapidly heats due to its internal resistance to electrical current. Part of the heat (140) generated by the heating element (120) vaporizes a small portion of the fluid adjacent to the heating element (120). The vaporization of the fluid creates a rapidly expanding vapor bubble (130) that overcomes the capillary forces retaining the fluid within the firing chamber (110) and nozzle (115). As the vapor bubble (130) continues to expand, a droplet (135) is ejected from the nozzle (115).

In FIG. 1C, the voltage is removed from the heating element (120) which rapidly cools and the vapor bubble (130) collapses. This creates low pressure in the firing chamber (110), which draws liquid into the firing chamber (110) from both the fluid reservoir and the nozzle (115). The ejected latex ink droplet (135) impacts the substrate (140) and adheres to its surface. A heating unit (150) cures the latex ink by applying radiant and/or convective heating (145). This evaporates a portion of the carrier fluid and softens the latex to form a cohesive and a water resistant latex ink layer (155). The latex in the ink layer (155) is both cohesive and adhesive. This allows the latex to encapsulate the pigment particles and stabilize them on the surface of the substrate (140).

Latex inkjet inks may have a number of advantages, including high color contrast, water resistance, scratch resistance, and other characteristics. However, when latex inkjet inks are used in a thermal droplet generator, the latex particles can be prematurely activated by the heat from the firing resistor. This can result in a number of challenges, including adhesion of latex particles to the firing resistor itself.

Figure 2:
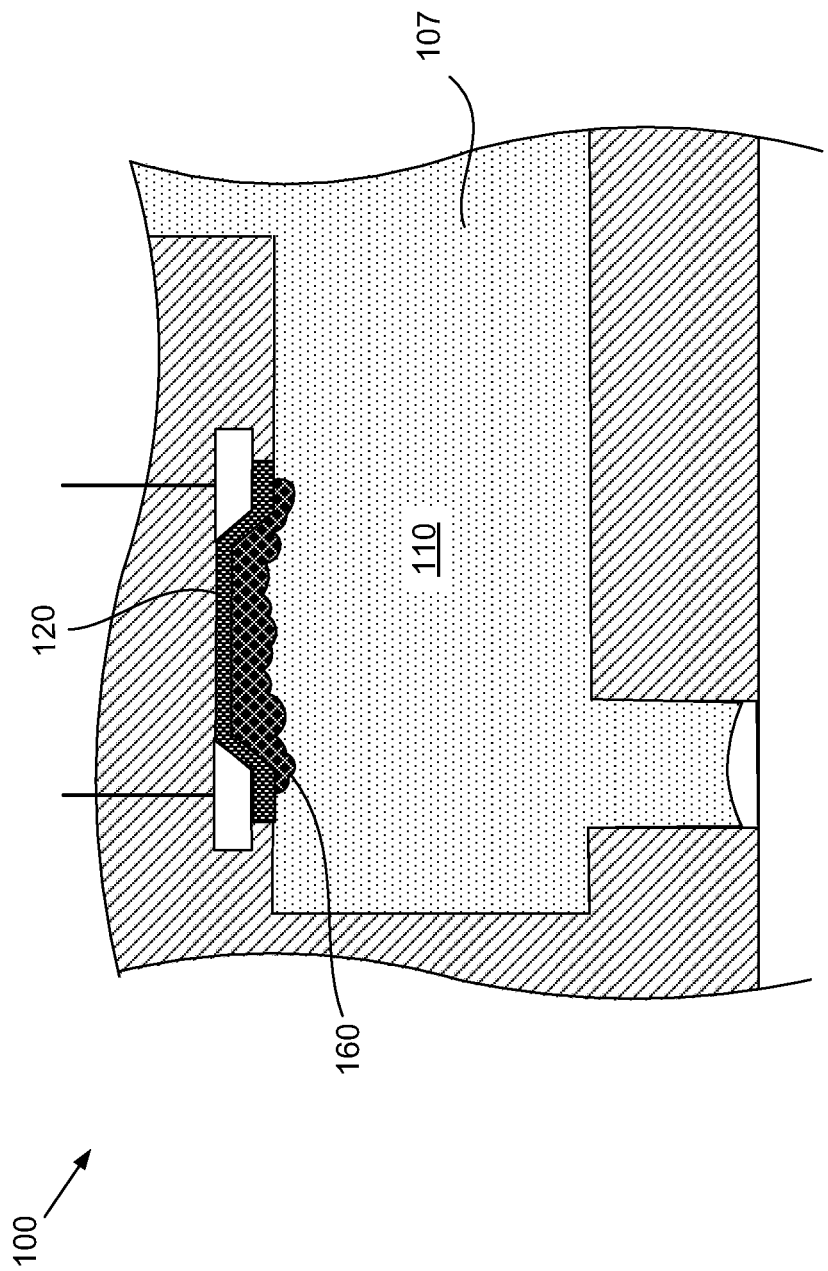
FIG. 2 is a side cross-sectional view of an illustrative thermal inkjet droplet generator that has accumulated latex solids on the firing resistor, according to one example of principles described herein.

FIG. 2 shows a firing resistor (120) in a droplet generator (100) with a layer (160) of latex solids that have adhered to its exposed surface. Adhesion of the latex solids to the firing resistor (120) is undesirable for a number of reasons. For example, the latex layer (160) insulates the ink (107) from the heat generated by the resistor (120). The latex layer (160) may also create prenucleation sites where the ink (107) preferentially vaporizes. Additionally, the latex layer (160) may trap gasses that further insulate the ink (107) from the heat generated by the firing resistor (120). Consequently, vapor bubbles created in the firing chamber (110) may be weak, delayed, and fragmented. This can result in changing droplet size and velocity as the latex layer (160) accumulates on the firing resistor (120).

Changes in the droplet weight can have undesirable effects on the image quality of prints produced with the inkjet printer. For example, a change in drop weight can result in streaking, lower color contrast and less accurate color reproduction. In some implementations, the change in drop weight of a droplet generator is related to the number of droplets it has ejected. Low droplet velocities may have a number of undesirable effects, including misplaced droplets and/or higher aerosol generation. Consequently, if some of the droplet generators in the inkjet print head have been used significantly more than surrounding droplet generators, a color difference may be observed between the more used and less used droplet generators. Additionally, as the inkjet printhead is used, an overall degradation in its ability to dispense the latex ink can be observed.

Figure 3A:
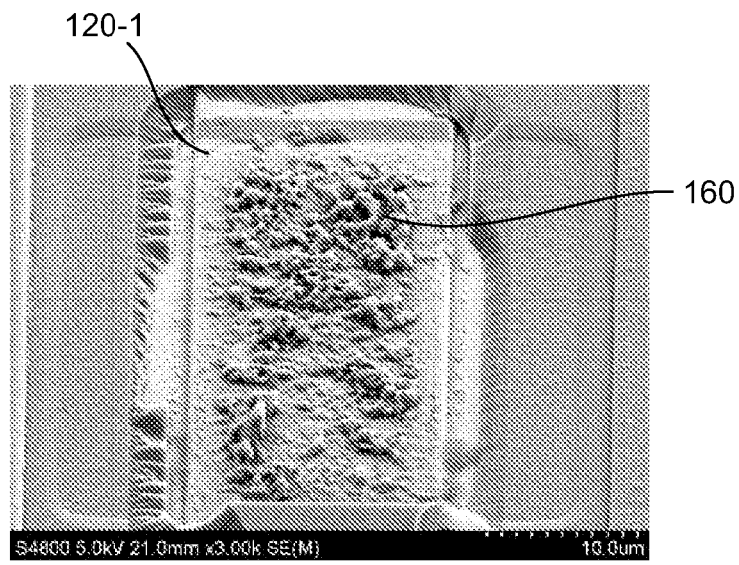
FIG. 3A is a scanning electron microscope picture of an illustrative firing resistor that has accumulated latex solids, according to one example of principles described herein.

FIG. 3A is a scanning electron microscope picture of a firing resistor (120-1) that has accumulated latex solids (160) after 200 million firing events. As shown in the picture, the latex layer (160) may not be uniform. This can contribute to lack of coordination in the bubble formation. Ideally, the vapor bubble (130, FIG. 1B) would form instantaneously over a relatively large area of the firing resistor (120-1). However, because of the latex layer (160), the bubble formation may be delayed in some areas and be triggered early in some other areas. This can result in the formation of vapor bubbles that are less effective in repeatedly ejecting ink droplets.

A number of approaches can be taken to reduce the accumulation of latex on the resistors. For example, the amount of latex in the ink can be reduced. This slows the formation of the latex layer of the firing resistor by reducing the amount of latex that is in proximity to the firing resistor for any given firing. However, reduced concentrations of the latex can reduce the effectiveness of the latex in encapsulating and binding the pigments to the substrate. Additionally, the ink film may have a reduced strength at lower latex concentrations. Another technique that may be used involves adding a phosphate ester to the inkjet ink. This may be effective for some ink formulations, but may be less effective for other formulations.

The inventors have unexpectedly discovered that the addition of a polystyrene resin to a latex ink formulation can significantly reduce the accumulation of the latex on the firing resistor. This polystyrene resin is not chemically bound to the pigment particles, but is added as separate vehicle components in a free solution form. This results in a surprising reduction in the accumulation of latex on the firing resistor and substantially maintains the performance of the droplet generator over its lifetime.

Figure 3B:
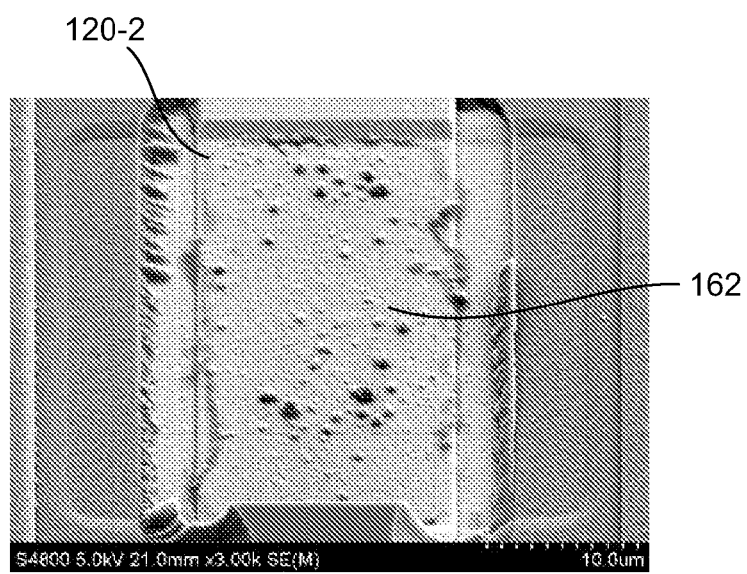
FIG. 3B is a scanning electron microscope picture of a firing resistor that fired an illustrative ink with an antifouling additive, according to one example of principles described herein.

FIG. 3B shows a firing resistor (120-2) that has a minimal accumulation of latex (162) over its exposed surface. The firing resistor (120-2) has been fired substantially the same number of times as the firing resistor (120-2) shown above in FIG. 3A. Additionally, the firing resistor (120-2) shown in FIG. 3B has fired the same ink formulation as the firing resistor (120-1) shown in FIG. 3A. However, the ink used by the firing resistor (120-2) shown in FIG. 3B included a polyester based anti-fouling additive. This anti-fouling additive is added as a free solution to the liquid carrier from 0.01% to 1% of the total volume of the ink. As used in the specification and appended claims, the term "anti-fouling" refers to ink or components within an ink which reduce accumulation of ink on a firing resistor. The accumulation of ink on a firing resistor is called "kogation." The term "free solution" refers to dispersed or soluble components in an ink which are not chemically bonded to other components in the ink.

The polyester resin may be a water-based styrene acrylic emulsion such as those in the JONCRYL family from BASF. The JONCRYL family includes, but is not limited to, JONCRYL 296, 671, 683, and 696. In one implementation, the polyester resin is JONCRYL 683 from BASF. JONCRYL 683 is a copolymer of styrene, alpha methyl styrene, and acrylic acid having a molecular weight of approximately 8,000 an acid number of approximately 150-160 mg of KOH/g of resin and a glass transition temperature of approximately 74° C.

Table 2, below, describes one specific example of an ink composition which includes a polystyrene anti-fouling additive dispersed in a liquid carrier as a free solution.

TABLE 2

| Latex | 8% |
|---|---|
| Pigment | 1-5% |
| 2-Pyrrolidone | 16.00% |
| MPDiol | 9.00% |
| Fluorsurfactant | 0.75% |
| Crodafos N3 acid | 0.20% |
| Tergitol 15-S-12 | 0.35% |
| JONCRYL 683 | 0.01-1% |
| Deionized Water | remainder |

Figure 4:
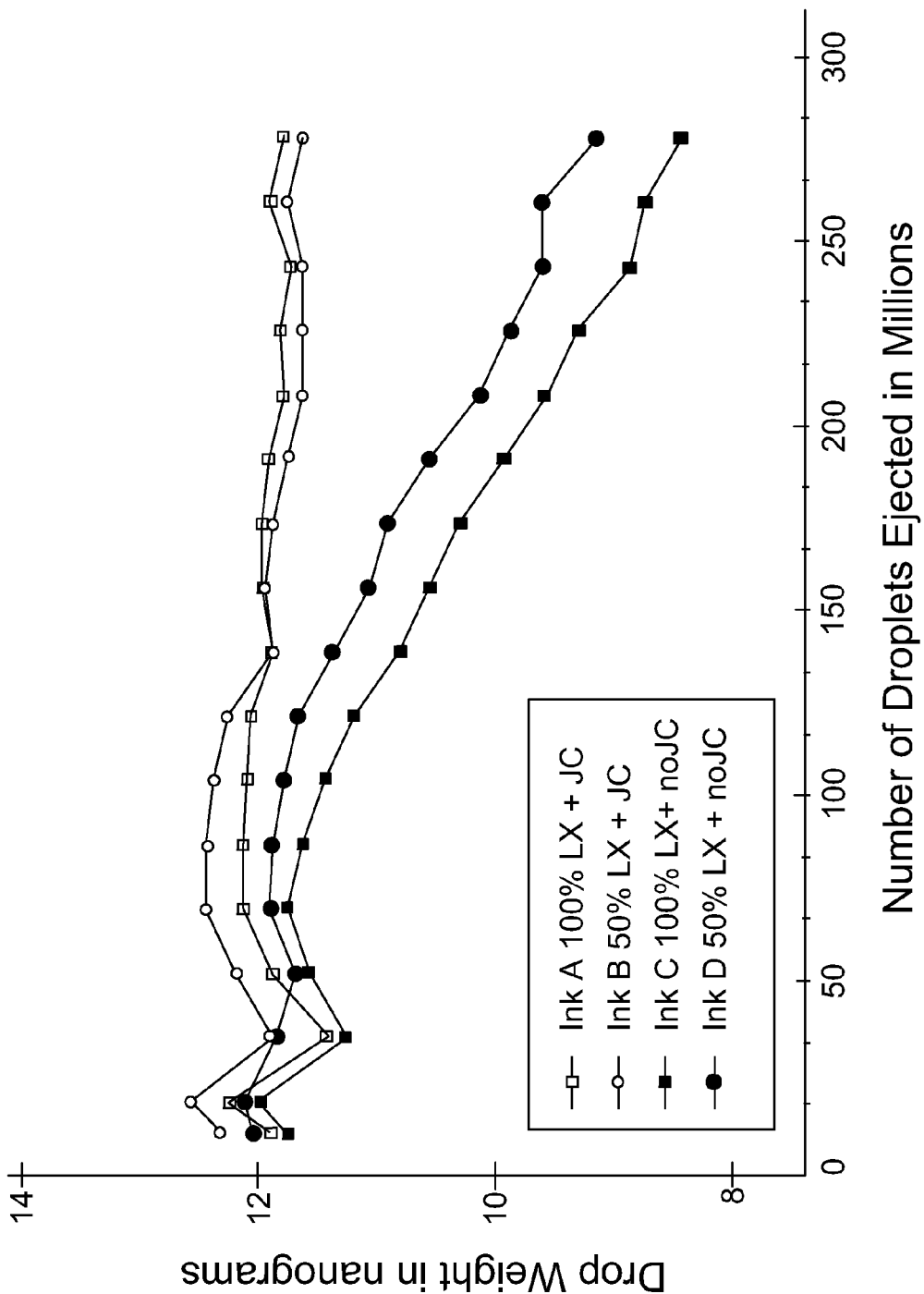
FIG. 4 is an illustrative graph of ejected drop weights of ink droplets as a function of the number of ink droplets ejected, according to one example of principles described herein.

FIG. 4 is a graph of ejected drop weights of ink droplets as a function of the number of ink droplets ejected. The horizontal axis shows the number of ink droplets ejected by droplet generators. The vertical axis shows the drop weight in nanograms. Ideally, the drop weight would remain constant over the measured period. The same basic ink formulation was used to create four different inks. Ink A, shown by open squares, includes 100% of the latex emulsion and an antifouling additive. Ink B, shown by open circles, includes 50% of the latex emulsion and an antifouling additive. Ink C, shown by filled squares, includes 100% of the latex emulsion and no antifouling additive and Ink D, shown by filled circles, that includes 50% of the latex emulsion and no antifouling additive.

The four inks are all dispensed using substantially identical droplet generators and initially have approximately the same drop weights. However, Ink C and Ink D show a decrease in droplet weight over time. For example, Ink C has a droplet weight of 11.6 nanograms at 75 million drops. However, by 225 million drops, the average weight of the droplets of Ink C is 9.6 nanograms and at 275 million drops, the droplet weight is approximately 8.5 nanograms. This represents approximately a 40% drop in droplet weight over the testing.

Ink D includes half the latex used in Ink C. However, Ink D shows a similar reduction in droplet weight during the test. This indicates that the reducing the amount of latex in this ink does not produce the desired drop weight stability over the life of the print head. Despite the reduction in latex, it is still accumulating on the resistors and interfering with the desired droplet ejection.

Ink A and Ink B include the antifouling additive and show remarkable more stable drop weight over time. This indicates that the antifouling additive is surprisingly successful in preventing the accumulation of latex material on the firing resistors. For example, Ink B has a maximum drop weight of approximately 12.5 nanograms and a minimum drop weight of about 11.5 nanograms. This is a reduction of only 8% over the measurement period of 275 million drops. Similarly, Ink A has a maximum drop weight of approximately 12.2 nanograms and a minimum drop weight of about 12.3 nanograms. However, the minimum drop weight for Ink A occurs at only 30 million drops. If this data point is neglected, the reduction in drop weight for Ink A over the measurement period is less than 5%.

Figure 5:
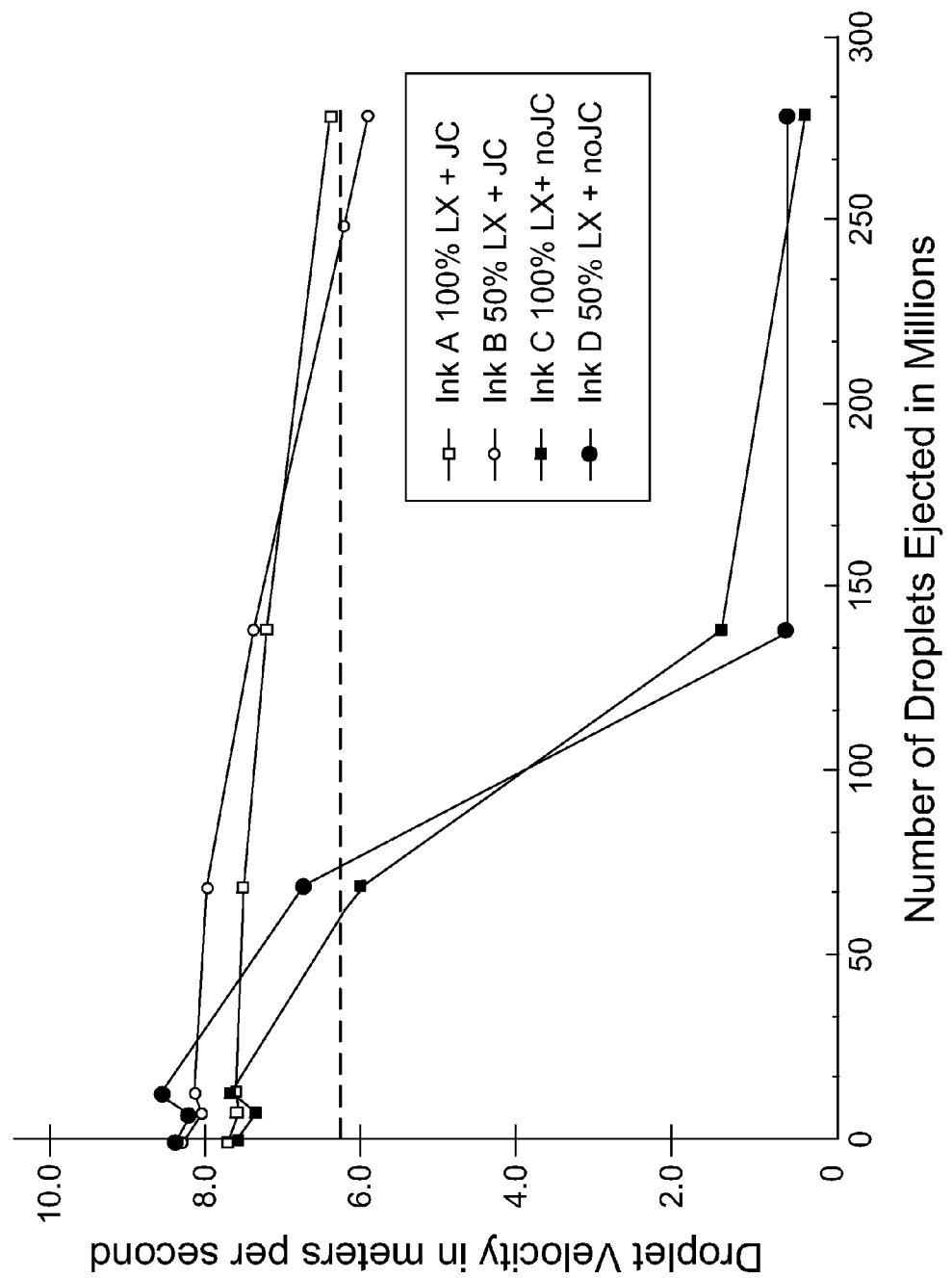
FIG. 5 is an illustrative graph of velocities of ejected ink droplets as a function of the number of ink droplets ejected, according to one example of principles described herein.

FIG. 5 is a graph of velocities of ejected ink droplets as a function of the number of ink droplets ejected for the same four inks. The horizontal axis shows the number of ink droplets ejected by droplet generators. The vertical axis shows the droplet velocity in meters per second. Ideally, the droplet velocity would remain constant over the measurement period. All the droplet generators initially eject ink droplets at approximately 8 meters per second. However, the droplet generators ejecting Ink C and Ink D show a rapid decline in droplet velocity beginning at about 15 million drops and extending to approximately 130 million drops. The ink droplet velocities from 130 to 275 million drops are relatively stable at roughly 1 meter per second. This shows that the absence of the antifouling additive in Ink C and Ink D has allowed significant latex deposits to form on the resistors.

Ink A and Ink B both include the antifouling additive. As discussed above, Ink A includes 100% latex and Ink B includes 50% latex. Ink A and Ink B show significantly lower changes in velocity. For example, Ink A begins the test with a velocity of about 7.5 meters per second and ends the test with a drop velocity of approximately 6.3 meters per second. Similarly, Ink B starts the test with droplet velocities that are slightly greater than 8 meters per second and ends the test with droplet velocities just less than 6 meters per second.

The dashed horizontal line is a threshold used to evaluate the performance of the inks and droplet generators. In this example, only Ink A maintained droplet velocities above the threshold throughout the test. The thresholds may be selected using a number of factors such as image quality measurements and printhead lifetime expectancy. In one example, the threshold may be 80% of the average velocity and/or weight of droplets first dispensed by the thermal droplet generator. Although the threshold is shown as a horizontal line, the threshold may have a variety of forms, including a function that decreases as the number of ejected droplets increases.

After the test was performed, the droplet generators were disassembled to visually confirm the accumulation of latex on the firing resistors of the droplet generators that dispensed Ink C and Ink D. FIGS. 3A and 3B are representative of the differences in latex accumulation between resistors firing inks without the antifouling additive and resistors firing inks with the antifouling additive.

Figure 6:
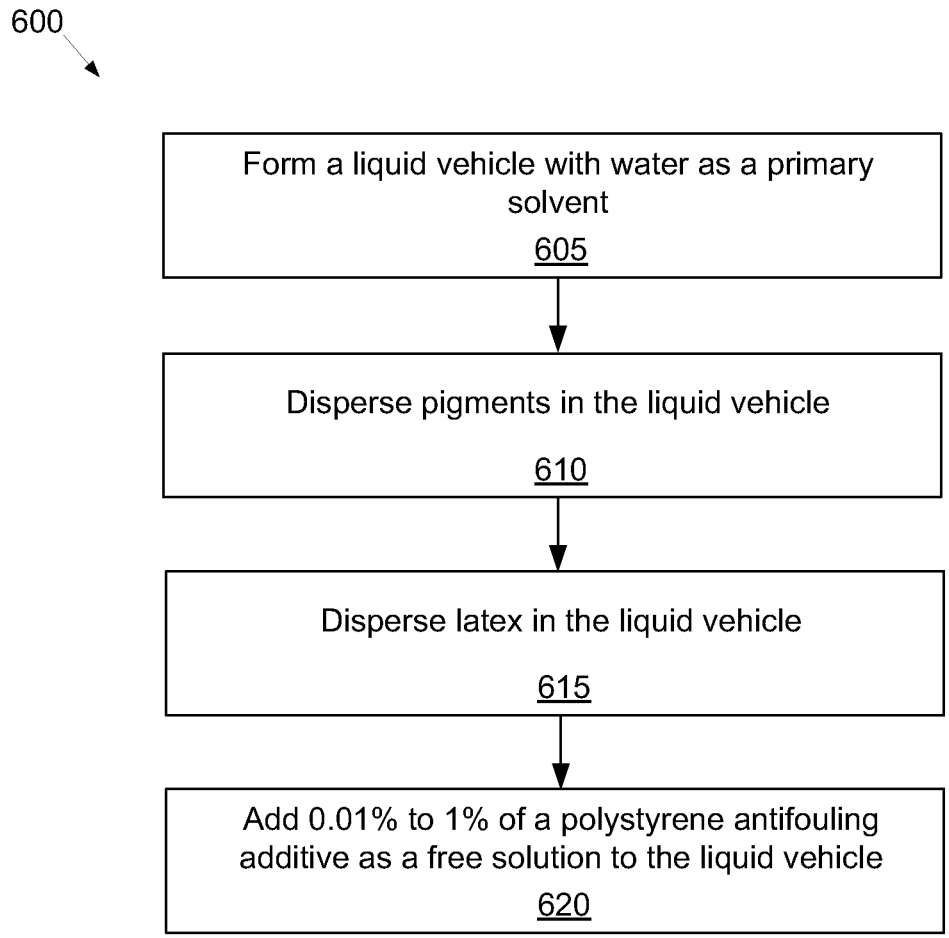
FIG. 6 is a flowchart of an illustrative method for forming a latex ink with an antifouling additive, according to one example of principles described herein.

FIG. 6 is a flowchart of an illustrative method (600) for forming a latex ink with an antifouling additive. The method includes forming a liquid vehicle with water as a primary solvent (block 605). As discussed above, the liquid vehicle may include the primary solvent and co-solvents such as a phosphate-containing surfactant. Other ingredients that can be present include organic co-solvents, other surfactants, biocides, sequestering agents, and other components. The liquid vehicle has characteristics that allow the latex ink to be jettable by the thermal droplet generators.

The pigment particles are dispersed in the liquid vehicle (block 610). As discussed above, a wide variety of pigment particles exhibiting various colors and characteristics may be used. For example, the pigment particles may be chemically modified by binding a functional group to the pigment particles. In one implementation, the pigment particles are modified by chemically bonding a monomer or polymer functional group to the pigment particles. This functional group may be the same type of polymer that is used as the antifouling additive, but serves a distinctly different purpose. In contrast to the antifouling additive, the functional groups are not in free solution because they are bound to the pigment particles. These functional groups may serve a number of purposes, including making the pigments more stably dispersed in the liquid vehicle and binding the pigments to the latex during curing.

Latex particles are dispersed in the liquid vehicle (block 615). As discussed above, the latex particles may be formed from a variety of materials and may have size between 20 and 350 nanometers. In one implementation, the latex particles have an average size that is between 10 and 300 nanometers.

The polystyrene antifouling additive is added as a free solution to the liquid vehicle so that the polystyrene antifouling additive makes up 0.01 wt % to 1 wt % of the ink (block 620). The polystyrene antifouling additive may be formed from a variety of water dispersible polymers. For example, the polystyrene antifouling additive may be copolymer of styrene, alpha methyl styrene, and acrylic acid having a molecular weight of approximately 8,000 an acid number of approximately 150-160 mg of KOH/g of resin and a glass transition temperature of approximately 74° C. As shown above, the polystyrene antifouling additive reduces the amount of latex that accumulates on the firing resistors in the thermal droplet generators and preserves the functionality of the droplet generators over the lifetime of the printhead.

The method described above is only an illustrative example. A number of modifications could be made to the method. For example, blocks could be added, reordered, combined, or eliminated. In one implementation, the latex and pigments could be simultaneously dispersed in the liquid vehicle. The arrangement of the blocks does not imply a particular order. For example, the polystyrene antifouling additive may be added to the liquid vehicle prior to the dispersing the pigments and/or latex in the liquid vehicle.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A thermal inkjet latex ink comprising:
   a liquid vehicle;
   pigment dispersed in the liquid vehicle;
   latex dispersed in the liquid vehicle; and
   a styrene polymer based anti-fouling additive dispersed in the liquid vehicle as a free solution, wherein the anti-fouling additive is a copolymer of styrene, alpha methyl styrene, and acrylic acid having a molecular weight of approximately 8,000, an acid number of approximately 150-160 mg of KOH/g of resin, and a glass transition temperature of approximately 74° C.

2. The ink of claim 1, in which a primary solvent of the latex ink is water, the latex ink being jettable by thermal droplet generators.

3. The ink of claim 1, in which a particle size of the latex dispersed in the liquid vehicle is between 100-300 nanometers.

4. The ink of claim 1, in which the anti-fouling additive comprises 0.01% to 1% by weight of the latex ink.

5. The ink of claim 1, in which the pigment is chemically modified to improve its dispersion stability in the latex ink compared with unmodified pigment.

6. The ink of claim 1, further comprising a phosphate-containing surfactant.

7. A method of formulating the latex inkjet ink of claim 1, the method comprising:
   forming a liquid vehicle with water as a primary solvent;
   dispersing pigments in the liquid vehicle;
   dispersing latex in the liquid vehicle; and
   adding 0.01 wt % to 1 wt % of the antifouling additive as a free solution to the liquid vehicle.

8. The ink of claim 1, in which the anti-fouling additive comprises a polyester.

9. The ink of claim 1, in which the anti-fouling additive comprises an acrylic copolymer.

10. The ink of claim 1, further comprising a water soluble surfactant.

11. The ink of claim 1, further comprising a fluorosurfactant.

12. The ink of claim 1, in which the anti-fouling additive is an emulsion.

13. The ink of claim 1, in which a primary solvent is water.

* * * * *

UNITED STATES PATENT AND TRADEMARK OFFICE
CERTIFICATE OF CORRECTION

| | | |
|---|---|---|
| PATENT NO. | : 9,175,181 B2 | Page 1 of 1 |
| APPLICATION NO. | : 14/009030 | |
| DATED | : November 3, 2015 | |
| INVENTOR(S) | : Thomas W. Butler et al. | |

It is certified that error appears in the above-identified patent and that said Letters Patent is hereby corrected as shown below:

Claims

In column 12, line 21, in Claim 7, delete "forming a" and insert -- forming the --, therefor.

In column 12, line 22, in Claim 7, delete "dispersing pigments" and insert -- dispersing the pigments --, therefor.

In column 12, line 23, in Claim 7, delete "dispersing latex" and insert -- dispersing the latex --, therefor.

Signed and Sealed this
Twenty-fourth Day of May, 2016

Michelle K. Lee
*Director of the United States Patent and Trademark Office*